(12) United States Patent
Sharman et al.

(10) Patent No.: US 8,730,359 B2
(45) Date of Patent: May 20, 2014

(54) IMAGE PROCESSING

(75) Inventors: Karl Sharman, Eastleigh (GB); Manish Devshi Pindoria, Stanmore (GB); Stephen Charles Olday, Basingstoke (GB); Nicholas Ian Saunders, Basingstoke (GB)

(73) Assignee: Sony Corporation, Tokyo (JP)

( * ) Notice: Subject to any disclaimer, the term of this patent is extended or adjusted under 35 U.S.C. 154(b) by 56 days.

(21) Appl. No.: 13/405,827

(22) Filed: Feb. 27, 2012

(65) Prior Publication Data

US 2012/0229665 A1      Sep. 13, 2012

(30) Foreign Application Priority Data

Mar. 7, 2011      (GB) .................................. 1103755.3

(51) Int. Cl.
*H04N 9/04*      (2006.01)
*H04N 3/14*      (2006.01)

(52) U.S. Cl.
USPC .......................................... 348/272; 348/320

(58) Field of Classification Search
USPC .................. 348/294–308, 272–278, 320–324
See application file for complete search history.

(56) References Cited

U.S. PATENT DOCUMENTS

| | | | |
|---|---|---|---|
| 3,971,065 A | 7/1976 | Bayer | |
| 7,612,803 B2 * | 11/2009 | Meitav et al. | 348/222.1 |
| 7,719,582 B2 * | 5/2010 | Wada et al. | 348/272 |
| 2002/0063787 A1 * | 5/2002 | Watanabe | 348/272 |
| 2006/0044428 A1 * | 3/2006 | Tanaka | 348/272 |
| 2007/0030366 A1 * | 2/2007 | Compton | 348/272 |

OTHER PUBLICATIONS

Patents Act 1977: Search Report under Section 17(5) issued Jun. 16, 2011, in Great Britain Application 1103755.3.
"Next generation CineAlta camera with new 8K CMOS image sensor", Professional Products > Broadcast & Pro A/V, http://www.sony.co.uk/biz/content/id/1237480935621/section/home/pro/duct/broadcast---pro-a-v/parentFlexibleHub=1166605171707 see especially 4th paragraph, nothing the date of Apr. 11, 2010, 2 pages.

* cited by examiner

*Primary Examiner* — Tuan Ho
*Assistant Examiner* — Selam Gebriel
(74) *Attorney, Agent, or Firm* — Oblon, Spivak, McClelland, Maier & Neustadt, L.L.P.

(57) ABSTRACT

Image processing apparatus comprises a demosaic processor for receiving a video signal comprising pixel data from an array of photosensors each having a respective color filter so as to restrict the sensitivity of that photosensor to a primary color range selected from a set of three or more primary color ranges, the array being such that the photosensors in alternate rows are sensitive to a first primary color range, and photosensors in intervening rows are sensitive to the other primary color ranges. The pixel data including pixel data from a first subset of the rows sensitive to the first primary color range, the first subset being the same from image to image of the video signal; and pixel data from a second subset of the rows of photosensors sensitive to the other primary color ranges, the second subset changing from image to image of the video signal.

11 Claims, 15 Drawing Sheets

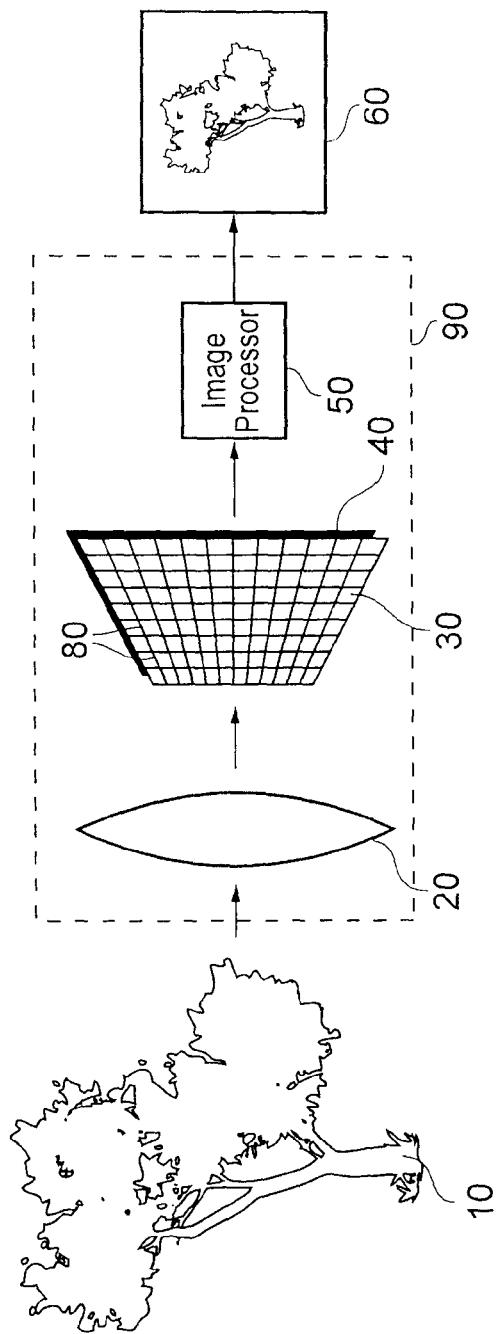
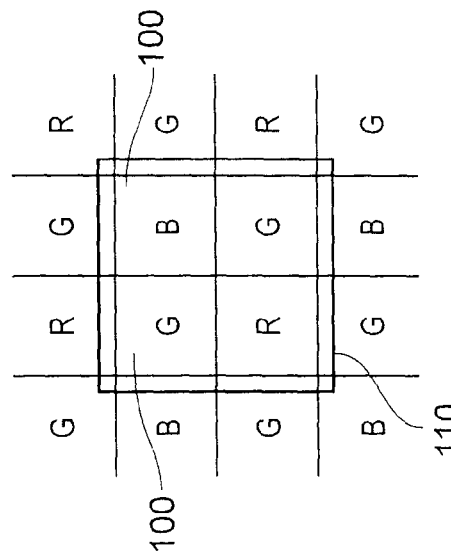

FIG. 15
FIG. 16
FIG. 17

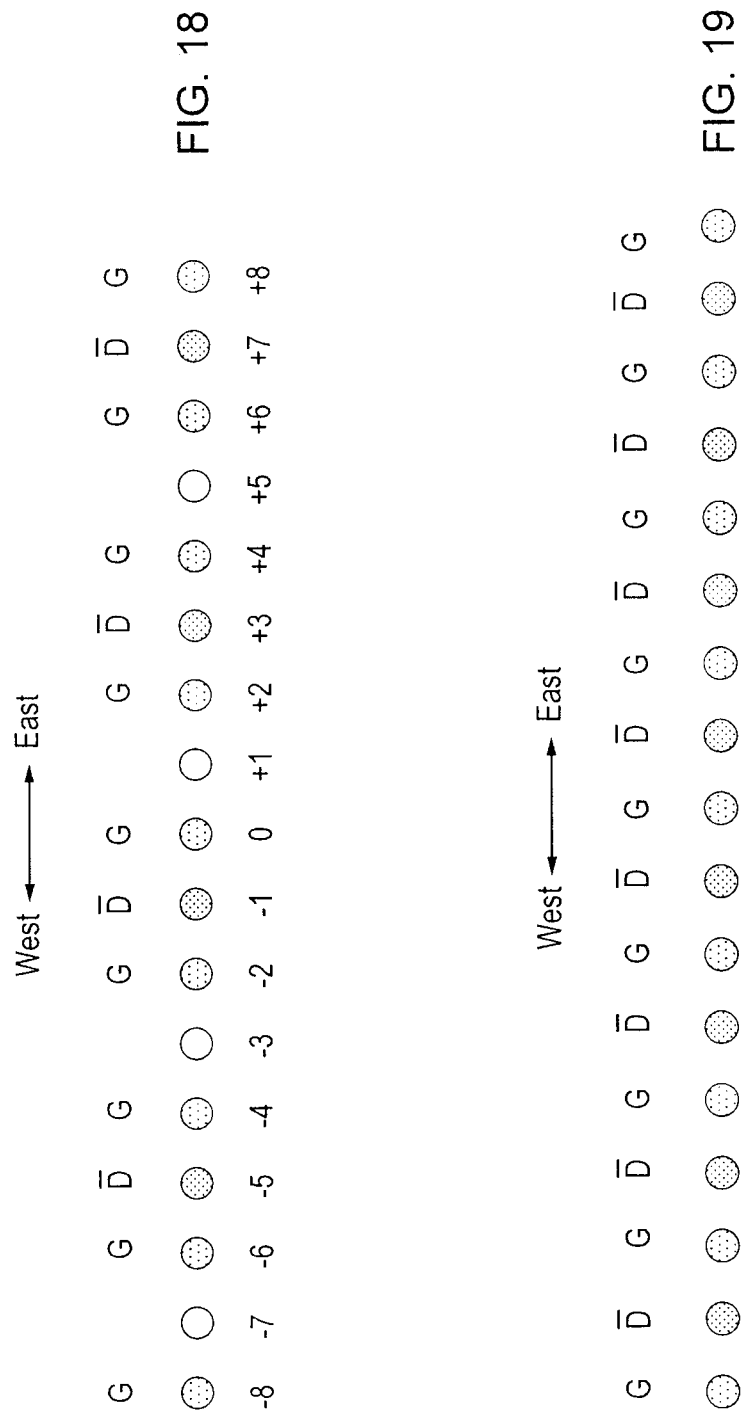

IMAGE PROCESSING

CROSS REFERENCE TO RELATED APPLICATION

The present application claims the benefit of the earlier filing date of application number GB1103755.3 which was filed at the United Kingdom patent office on 7 Mar. 2011, the entire content of which application is incorporated herein by reference.

BACKGROUND

1. Field of the Invention

This invention relates to image processing.

2. Description of the Related Art

An example image processing application will now be described in connection with a digital video camera.

In order to generate a colour image using a solid state image sensor (such as a charge coupled device (CCD) image sensor) it is necessary to ensure that different colour components are detected in respect of each pixel position. Some arrangement of colour filters is needed because typically the individual photosensors in an image sensor detect light intensity with little or no wavelength specificity, and therefore cannot themselves detect separate colour information.

One way to provide colour detection is to employ multiple image sensors, each detecting a respective colour component. For example, many digital video cameras use a three CCD system, with each CCD detecting a respective one of green, red and blue colour components. This arrangement requires the three CCDs to be optically aligned with one another to a sub-pixel accuracy, and also needs a light splitter and colour filter arrangement. Optical filters such as dichroic (or thin film) filters may be used for this task, as they have the useful property of passing light of a range of wavelengths while deflecting (rather than absorbing) light outside that range.

However, many digital cameras instead make use of a single CCD operating in conjunction with a colour filter array (CFA). The CFA is a mosaic of tiny colour filters fabricated over the individual pixel sensors of the image sensor.

The colour filters filter the light by wavelength range, such that the separate filtered intensities include information about the colour of light. Absorption (rather than dichroic) filters are generally used.

An example of the use of a CFA is shown schematically in FIG. 1 of the accompanying drawings. A scene 10 is captured by a camera 90 comprising a lens arrangement 20, a CFA 30 arranged on a CCD image sensor 40, and an image processor 50. The CFA 30 comprises an array of individual filter elements 80, generally one per individual pixel sensor of the CCD image sensor 40, each arranged to pass light of a respective colour. Although in FIG. 1 the CFA 30 is shown as an overlay on the CCD image sensor 40, in practice the optical filter elements can be fabricated directly on top of the pixels sensors as part of an overall semiconductor fabrication process.

There are many types of CFA. For example, a so-called Bayer filter, originally proposed in U.S. Pat. No. 3,971,065, contains filter elements giving information about the intensity of light in red, green, and blue (RGB) wavelength regions. An example of the pixel filter layout of a Bayer filter is shown in FIG. 2 of the accompanying drawings, which schematically illustrates the filter layout across a small number of pixel positions 100, with R representing a filter which passes red light, G representing a filter which passes green light, and B representing a filter which passes blue light. A basic pattern of four pixels (a square array of 2×2 pixels) 110 is repeated across the full extent of the CCD sensor.

One reason that more green elements are provided than red or blue elements is that the human eye is generally more sensitive to green light than to the other primary colours. So, the additional resolution in respect of green light mimics the colour response of the human eye. It is also useful because when red, green and blue colour component signals are electrically combined together to form a monochromatic luminance signal (Y), contributions from each colour component are weighted so that the luminance signal contains a greater proportion of the green component than either of the other two components.

The raw image data captured by the image sensor is then converted to the full-colour image, with intensities of all three primary colours represented at each pixel, by a so-called demosaicing algorithm which is tailored for each type of colour filter. In other words, the mosaic relationship of the detected colour components is undone by the demosaicing algorithm so as to provide, for each pixel, all three colour components in respect of a single effective pixel position. In the system of FIG. 1 this function is provided by the image processor 50, which generates an output colour image 60. The spectral transmittance of the CFA elements along with the demosaicing algorithm jointly determine the colour rendition of the camera.

SUMMARY

The foregoing paragraphs have been provided by way of general introduction, and are not intended to limit the scope of the appended claims. The described embodiments, together with further advantages, will be best understood by reference to the detailed description below taken in conjunction with the accompanying drawings.

This invention provides an image sensor comprising:

an array of photosensors each having a respective colour filter so as to restrict the sensitivity of that photosensor to a primary colour range selected from a set of three or more primary colour ranges, the array being such that the photosensors in alternate rows are sensitive to a first primary colour range, and photosensors in intervening rows are sensitive to the other primary colour ranges; and a pixel data reader arranged to output, in respect of each successive image of a video signal, pixel data from a first subset of the rows sensitive to the first primary colour range, the first subset being the same from image to image of the video signal;

the pixel data reader being arranged to output pixel data from a second subset of the rows of photosensors sensitive to the other primary colour ranges, the second subset changing from image to image of the video signal.

The invention provides an advantageous technique for reading a subset of pixel data from an image sensor of the type defined, while maintaining the same positions of one colour (such as green) pixels from frame to frame.

Various further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which:

FIG. 1 schematically illustrates the use of a CFA in a digital camera;

FIG. 2 schematically illustrates a Bayer filter;

FIGS. 15 to 19 respectively schematically illustrate source pixels for filtering processes;

DESCRIPTION OF THE EMBODIMENTS

Figure 3:
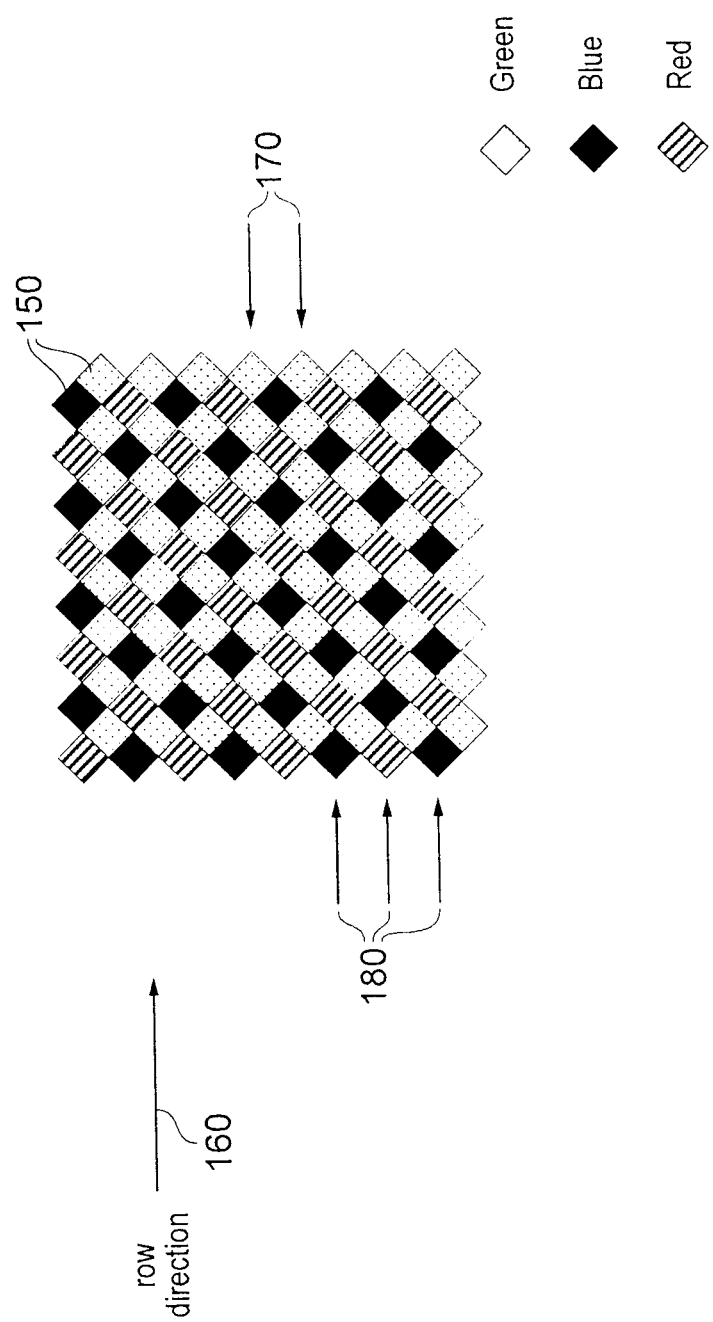
FIG. 3 schematically illustrates a double Bayer filter.

Reference is now made to the drawings, in which like reference numerals designate identical or corresponding parts throughout the several views.

Another proposed type of CFA is a so-called double Bayer filter, an example of which is shown schematically in FIG. 3. The arrangement and shape of the individual filter elements contrasts with that shown in FIG. 2. Firstly, the orientation of each individual filter element 150 is rotated by 45 degrees with respect to the pixel row direction 160 of the pixel array. Secondly, this arrangement results in there being whole rows 170 of green filter elements interspersed with rows 180 of alternate blue and red elements. It is noted that at the priority date of the present application the double Bayer filter does not necessarily represent publicly available prior art.

Figure 4:
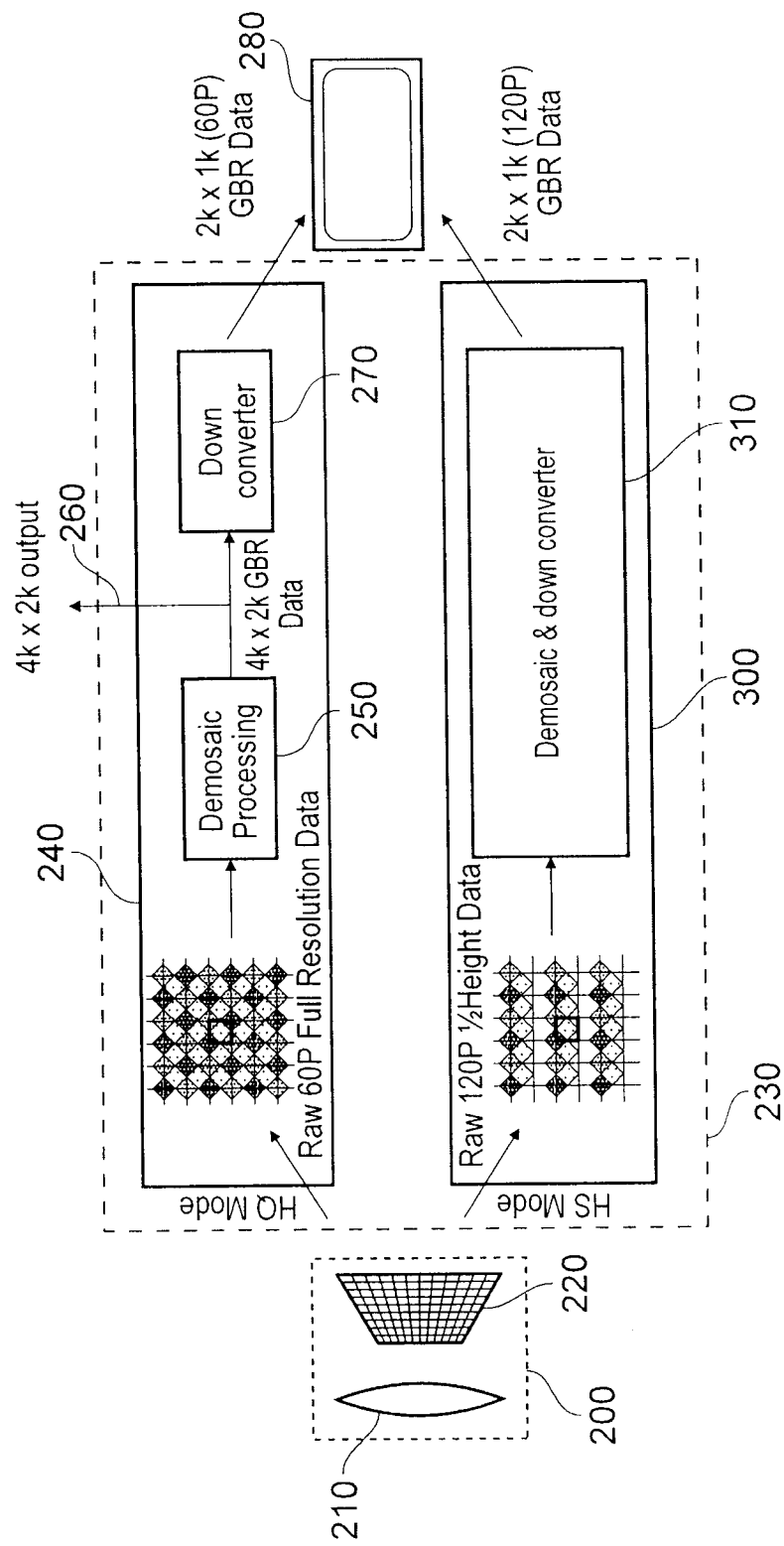
FIG. 4 schematically illustrates a camera and image processing apparatus.

FIG. 4 schematically illustrates a camera and image processing apparatus. The arrangement refers to a digital video camera but appropriate aspects of the techniques shown may be used in connection with the capture of still images. FIG. 4 therefore illustrates a video camera apparatus comprising an image sensor and apparatus for processing images captured by the image sensor.

In FIG. 4, a digital video camera 200 comprises a lens arrangement 210 and a CFA/CCD sensor 220, that is to say, a CCD sensor having an associated CFA according to the repeating double Bayer pattern shown schematically in FIG. 3. The CFA/CCD sensor 220 operates at a maximum or native resolution of 4096 horizontal pixels×2160 vertical pixels, referred to in the diagram in a shortened form as "4k×2k", or just "4k", where "k" takes the shorthand meaning of "about 1000". At this resolution, the CFA/CCD sensor 220 can operate at a picture rate of 60 progressively-scanned images per second, abbreviated to "60p" in the diagram. When discussing the resolution of the sensor, the number of "pixels" refers to the number of distinct groups of the three primary colours that are derivable from the captured data, and in practice corresponds to the number of green pixel sensors. So, in order to capture a full resolution 4k×2k image, the CFA/CCD image sensor requires 4k×2k of green pixel sensors, plus the corresponding red and blue pixels sensors according to the double Bayer pattern. So the total number of individual pixel sensors will be a multiple of 4k×2k. Accordingly, the CFA/CCD image sensor 220 provides an array of photosensors each having a respective colour filter so as to restrict the sensitivity of that photosensor to a primary colour range selected from a set of three or more primary colour ranges, the array being such that the photosensors in alternate rows are sensitive to a first primary colour range (green in this example), and photosensors in intervening rows are sensitive to the other primary colour ranges (red and blue in this example).

In the CFA/CCD sensor 220 operating at its full resolution, the output pixel positions are aligned to the green sample positions. This means that at each output pixel position only the green sample value is known, the blue and red sample values must be estimated using the green sample values and the surrounding blue and red sample values.

An image processor 230 provides the demosaic functions described above. The image processor 230 may be implemented within the body of the camera itself or within (for example) a separate camera control unit (CCU).

Either the CFA/CCD sensor 220 or the image processor 230 (or a combination of the two) provides a pixel data reader for reading appropriate pixel data from the CFA/CCD sensor.

The image processor 230 may operate in at least two modes. These are shown as separate processing paths for clarity of the diagram, but they may of course share some processing resources. Because of the different way in which data is read from the CFA/CCD sensor in the two cases, it is envisaged that the user chooses between the two modes for any particular video capturing operation. That is to say, the apparatus of FIG. 4 does not necessarily operate in both of the two modes at the same time.

In a first processing path 240, referred to as "HQ" (high quality) mode, the full resolution (4k×2k, 60p) image data generated by the CFA/CCD 220 is passed to a demosaic processor 250 which generates 4k×2k 60p GBR (green, blue, red) video data. This can be provided as an output 260 if required. Alternatively (or in addition), since many display devices in current use have a maximum display resolution of 2048×1080 pixels or 1920×1012 pixels ("2k×1k", or just "2k"), the 4k×2k 60p data may be spatially down-converted by a down converter 270 to the lower resolution of 2k×1k, 60p for display on a 2k×1k display device 280.

In a second processing path 300, referred to as "HS" (high speed) mode, only a subset of the pixel data is read from the CFA/CCD image sensor 220 in respect of each successive image, which allows images to be read from the CFA/CCD image sensor 220 at twice the rate of the HQ mode, namely 120 progressively scanned pictures per second or "120p". The subset of data read from the CFA/CCD image sensor may be considered as 4k×1k 120p data, although image data at this resolution is not provided as an output from the apparatus. The 120p image data is passed to a demosaic processor and down converter 310 for direct output as 2k×1k, 120p image data. In the second processing path, therefore, there is no possibility of an intermediate output of 4k×2k image data. However, the second processing path allows the output of 2k×1k data at the higher picture rate of 120p.

The patterns of captured green, blue and red pixels from which the output images may be derived in the first and second processing paths will now be described.

Figure 5:
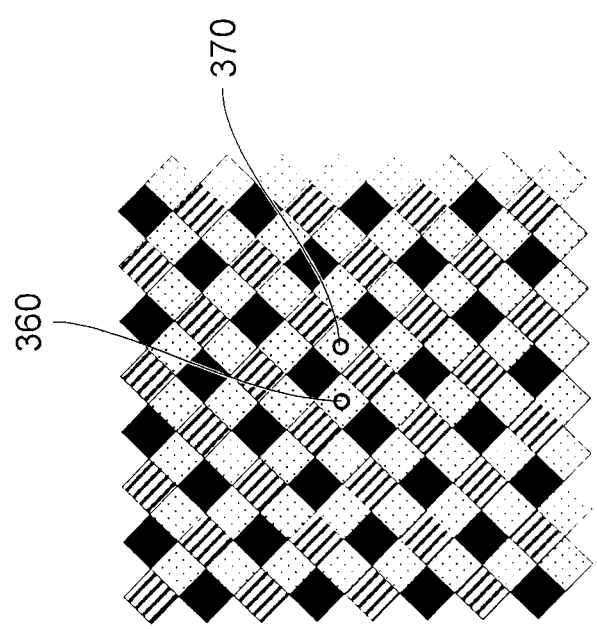
FIG. 5 schematically illustrates operation in an HQ mode.

In the first processing path (HQ mode), the green component of each output pixel is derived from one or more of the captured green pixels. The red component of that output pixel is derived by interpolation between red pixels and, potentially, interpolated green pixels surrounding that green pixel. By using the green samples, colour difference signals are formed between the interpolated green samples and known blue/red samples for the interpolation process. This helps maintain a constant hue. The blue component of that output pixel is derived by interpolation between blue pixels and, potentially, interpolated green pixels surrounding that green pixel. This arrangement is illustrated schematically in FIG. 5, in which a group of pixels, including a single green pixel and the two surrounding pixels in each of red and blue, is used to derive an output GBR pixel in respect of a spatial position 360. The next GBR pixel is derived from a similar group around the spatial position 370, and so on.

In the second processing path (HS mode), different options exist:

(a) Static GBR Mode

Figure 7:
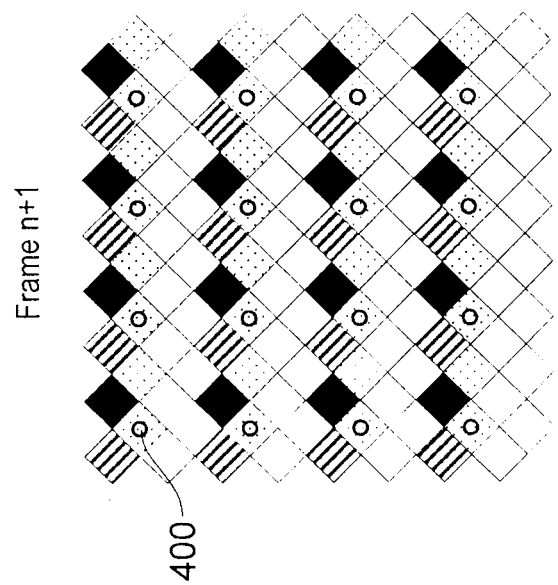
FIGS. 6 and 7 schematically illustrate the derivation of pixels in respect of even lines and odd lines respectively in a static GBR mode.
Figure 6:
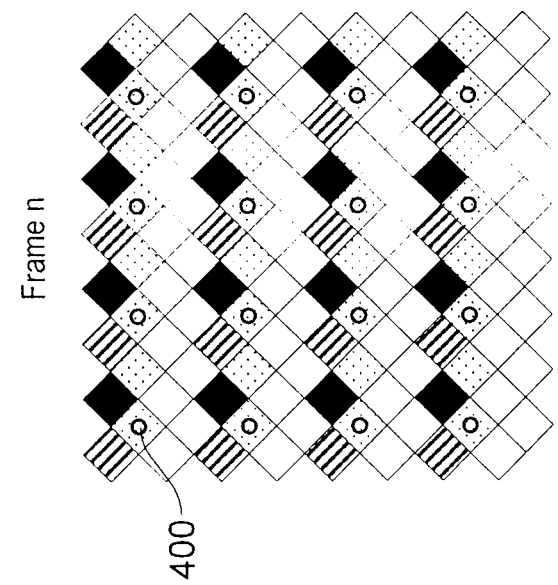

FIGS. 6 and 7 schematically illustrate the derivation of pixels in respect of even frames (FIG. 6) and odd frames (FIG. 7) respectively in a static GBR mode. Downscaled output pixel positions are shown as circles 400. The pattern of sensor outputs used to generate successive frames is static, which is to say that it does not vary from frame to frame.

(b) Alternate GBR Mode

Figure 9:
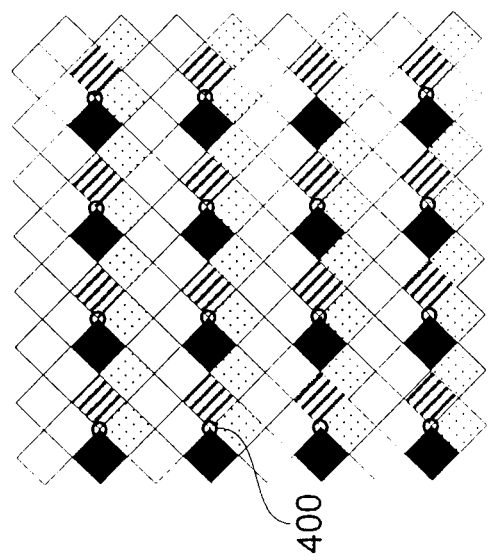
FIGS. 8 and 9 schematically illustrate the derivation of pixels in respect of even and odd lines respectively in an alternate GBR mode.
Figure 8:
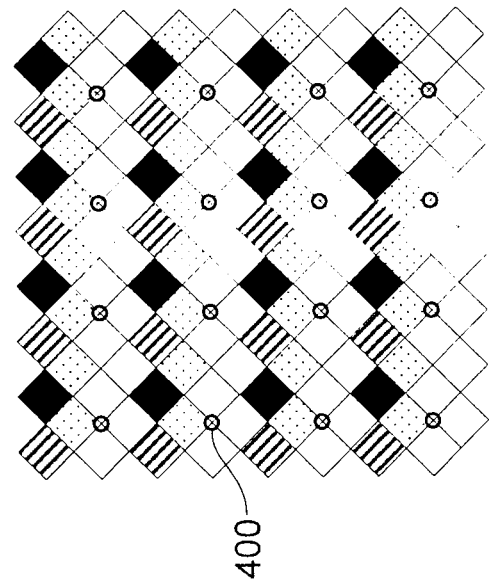

FIGS. 8 and 9 schematically illustrate this mode. Green, blue and red samples are generated using sample positions that are offset from one another in alternate frames. In particular, the green sample positions are offset by ±1 pixel vertically and the blue/red samples are offset by ±1 pixel vertically and ±1 pixel horizontally in alternate frames.

(c) Alternate BR Mode

Figure 11:
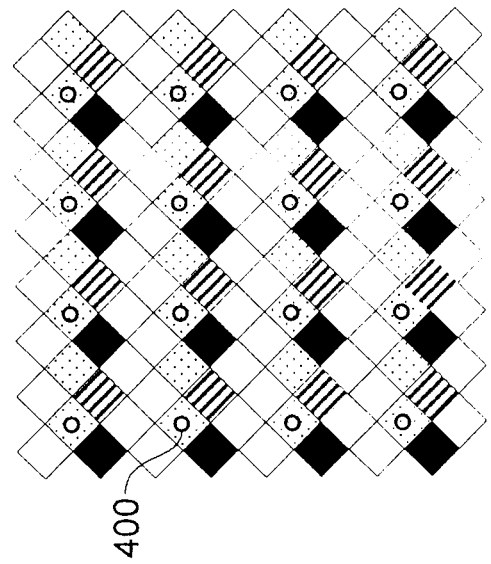
FIGS. 10 and 11 schematically illustrate the derivation of pixels in respect of even and off lines respectively in an alternate BR mode.
Figure 10:
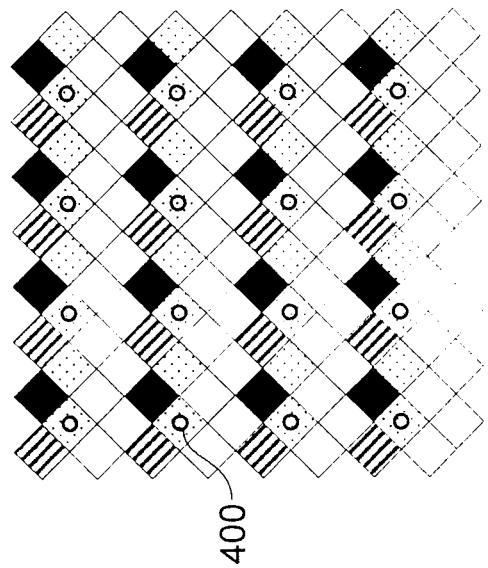

FIGS. 10 and 11 schematically illustrate an alternate BR mode in even and odd frames respectively of a 2k 120p progressive scan output. The output pixel positions 400 remain the same from frame to frame, and are centred on green image sensor positions, but the blue/red samples are offset by ±1 pixel vertically and ±1 pixel horizontally in alternate frames. This mode of operation has the advantage over the alternate GBR line scan mode of using green samples at the same spatial position every frame, thereby stabilising the output.

Therefore, in the alternate-BR mode, the pixel data reader mentioned above is arranged to output, in respect of each successive image of a video signal, pixel data from a first subset of the rows sensitive to the first primary colour range (green in this example), the first subset being the same from image to image of the video signal; and to output pixel data from a second subset of the rows of photosensors sensitive to the other primary colour ranges (blue and red in this example), the second subset changing from image to image of the video signal. In embodiments of the invention, the first subset comprises alternate ones of those rows sensitive to the first primary colour range, and/or the second subset alternates, from image to image of the video signal, between two possible second subsets of rows. In embodiments of the invention the two possible second subsets comprise: a second subset comprising those rows immediately beneath respective rows in the first subset; and a second subset comprising those rows immediately above respective rows in the first subset. In embodiments of the invention, pixel positions in the rows in the second subset are horizontally offset with respect to pixel positions in the rows of the first subset.

Embodiments of the invention relate to the alternate-BR mode.

Figure 12:
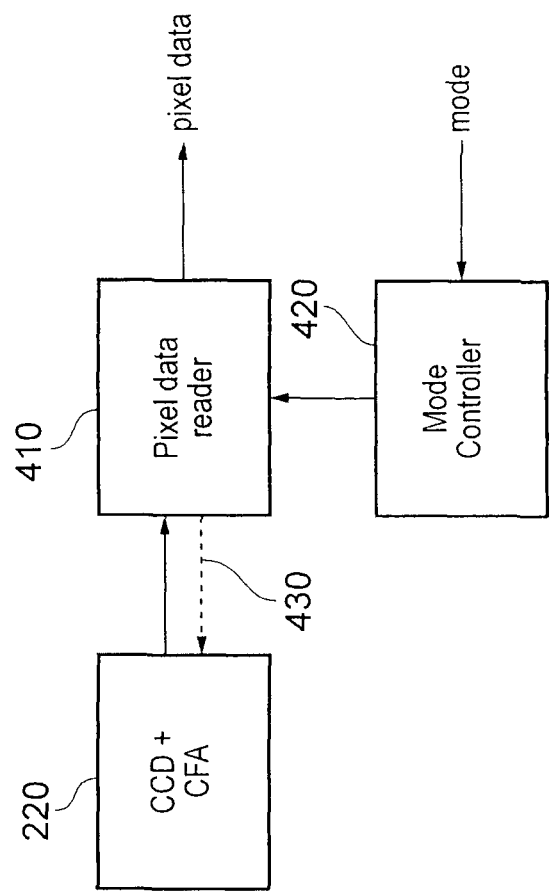
FIG. 12 is a schematic diagram of a CCD/CFA unit and associated controller.

FIG. 12 schematically illustrates the CCD/CFA unit 220 and associated controller logic comprising a pixel data reader 410 and a mode controller 420. The arrangement of FIG. 12 allows the pattern and rate of pixel reading from the CCD device to be changed, potentially at each frame, between the HQ and HS modes described above, and within the HS mode, amongst the static GBR, alternate GBR and alternate BR modes. In operation, the mode controller 420 receives mode specifying information, for example from the user, and applies appropriate control settings to the pixel data reader 410. The pixel data reader optionally applies control signals 430 (such as a clocking signal) to the CCD/CFA unit 220, and reads pixel data having a rate and a pattern appropriate to the current mode from the CCD/CFA unit. The is pixel data is supplied to the demosaic processor 250 or the demosaic processor and down converter 310 as appropriate.

Figure 13:
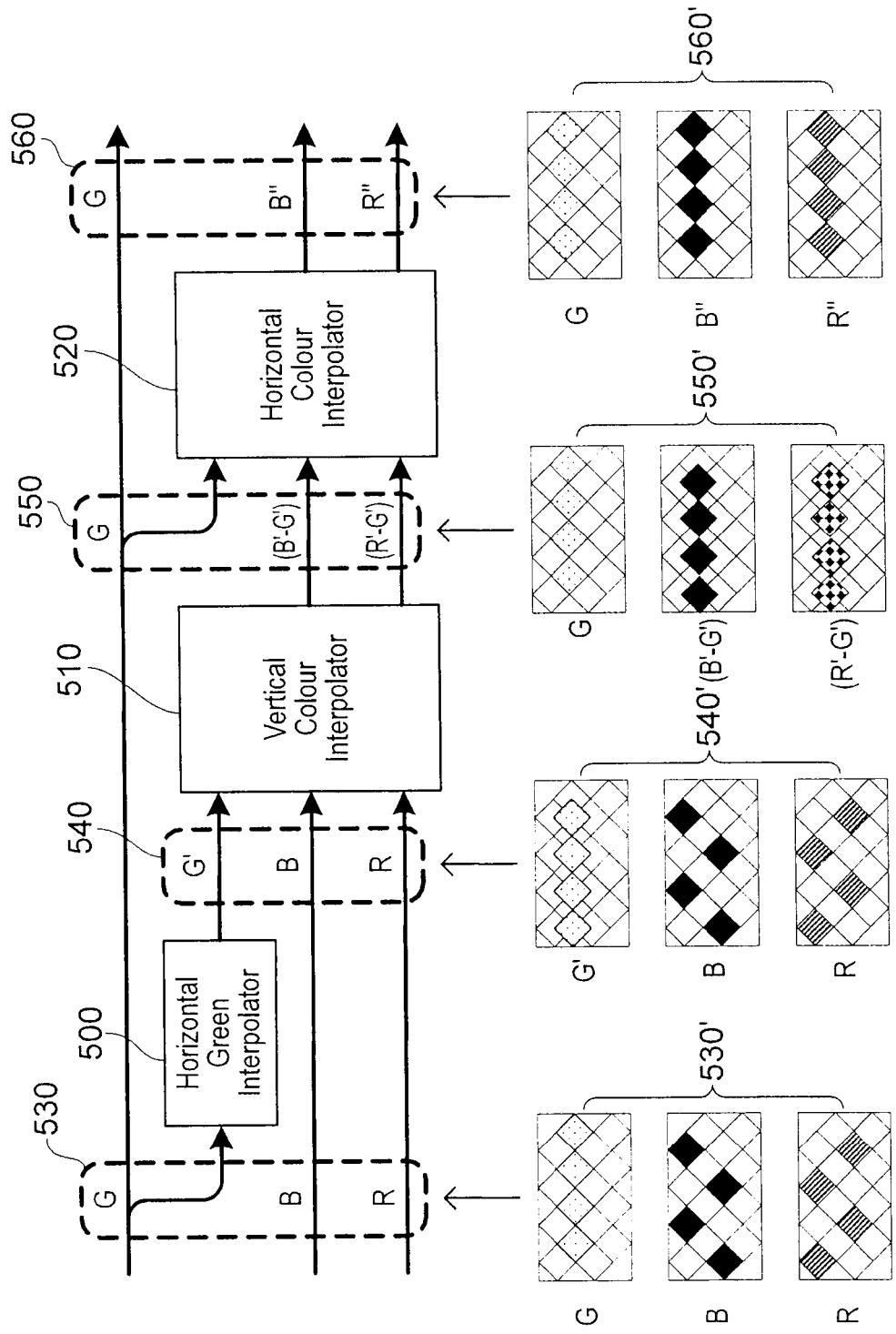
FIG. 13 schematically illustrates a demosaic processor.

FIG. 13 schematically illustrates a demosaicing process (as used, for example, by the demosaic and down converter unit 310) in respect of an alternate BR line scan.

In such embodiments of the invention, the demosaic and down converter 300 provides a demosaic processor for receiving a video signal comprising pixel data from an array of photosensors (such as that provided by the CFA/CCD sensor 220), the demosaic processor comprising a vertical interpolator for vertically shifting pixel data of the second subset so as to be vertically aligned with pixel data of the first subset. In embodiments of the invention, in which pixel positions in the rows in the second subset are horizontally offset with respect to pixel positions in the rows of the first subset, the technique makes use of a first horizontal interpolator for horizontally shifting the pixel positions of pixel data of rows of the first subset so as to provide intermediate pixel data which is vertically aligned with pixel data of rows of the second subset, the intermediate pixel data being supplied as an input to the vertical interpolator; and a second horizontal interpolator for horizontally shifting pixel data output by the vertical interpolator so as to be horizontally aligned with pixel data of rows of the first subset.

The alternate BR line scan pattern shown in FIGS. 10 and 11 generates green samples at the same spatial position every frame and blue/red samples that are offset by ±1 pixel both vertically and horizontally in alternate frames. FIG. 13 schematically illustrates the relative spatial positions of all the inputs and outputs at each stage of the demosaicing process.

The GBR signals read from the CCD/CFA 220 are supplied as an input signal 530. The positions of green, blue and red pixels (as read from the CCD/CFA) in the signal 530 are shown as 530' at the lower part of FIG. 13. These positions correspond to a frame of the signal illustrated in FIGS. 10 and 11.

From the signal 530, the green data is passed to a horizontal green interpolator which carries out a horizontal spatial interpolation to generate an interpolated green signal G' which, in combination with the original signals B and R forms a second GBR signal 540. The horizontally-shifted pixel positions of the interpolated green signal G' (shifted by 0.5 pixel) are also schematically illustrated at 540'. They are vertically stacked in alignment with the positions of the B and R pixels.

The signal 540 is supplied as an input to a vertical colour interpolator 510 which interpolates between pixel positions of the B and R signals respectively to generate vertically shifted signals B' and R' at pixel positions corresponding to the pixel positions in the signal G'. This interpolation of the B and R signals involves shifting one row down by 0.5 pixel and the next row up by 0.5 pixel, and so on. The G' signal is then subtracted from the B' and R' signals to generate (B'−G') and (R'-G') signals respectively as part of a third intermediate signal 550 having pixel positions shown as 550'.

Finally, the original G signal and the (B'-G') and (R'-G') signals are supplied as inputs to a horizontal colour interpolator 520. The colour difference values are interpolated horizontally to calculate a colour difference value at the required output pixel position. The interpolated colour difference value is then used to calculate the required red/blue value, so as to generate an output signal 560 comprising the original G signal along with B" and R" signals which have pixel positions now aligned to the pixel positions in the G signal (as shown at 560').

Colour Difference Interpolation

Natural images usually exhibit a high degree of spatial correlation between the colour channels. It is this high correlation probability that allows the spatial interpolators of the present embodiments to more accurately estimate the missing colour sample values than a simple uncorrelated bilinear interpolator. The spatial interpolator equations are all based on the rule that within a local region of an image, the differences or ratios between different colour channels along an interpolation direction are constant.

Colour difference rule between adjacent pixels n and n+1:

$$(G_{n+1}-G_n) \approx \alpha_B(B_{n+1}-B_n) \qquad \text{Eq. 1}$$

$$(G_{n+1}-G_n) \approx \alpha_R(R_{n+1}-R_n) \qquad \text{Eq. 2}$$

Colour Ratio Rule:

$$\frac{B_n}{G_n} \approx \frac{B_{n+1}}{G_{n+1}} \approx \frac{(B_{n+1}-B_n)}{(G_{n+1}-G_n)} \approx \frac{1}{\alpha_B} \qquad \text{Eq. 3}$$

$$\frac{R_n}{G_n} \approx \frac{R_{n+1}}{G_{n+1}} \approx \frac{(R_{n+1}-R_n)}{(G_{n+1}-G_n)} \approx \frac{1}{\alpha_R} \qquad \text{Eq. 4}$$

Where: $\alpha_B$=G/B gain and $\alpha_R$=G/R gain.

The alpha terms in the above equations are the white balance gain for the blue and red channels. These terms are used to correct any imbalance in the three input channels.

Figure 14:
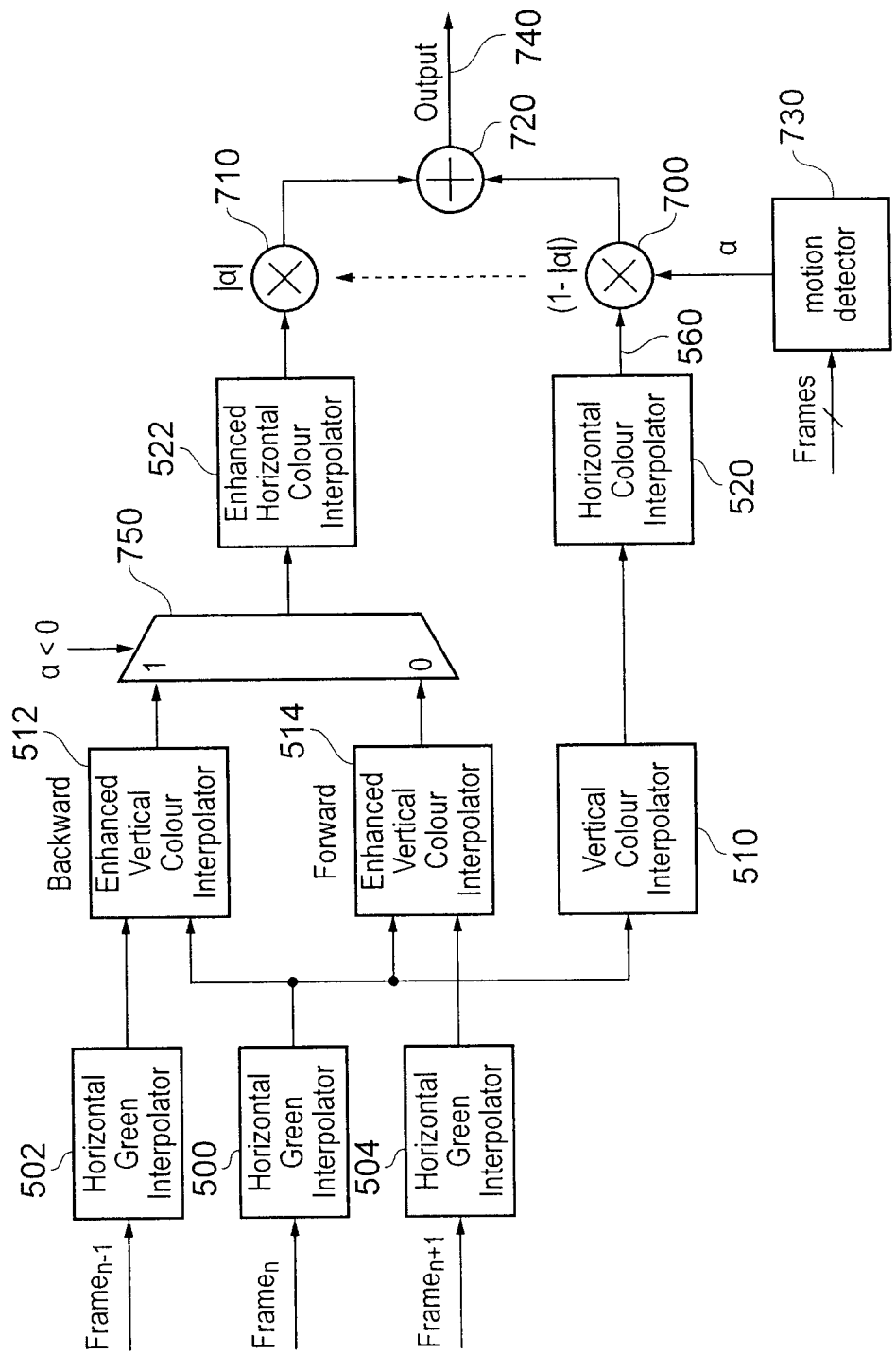
FIG. 14 schematically illustrates an enhanced demosaic processor.

In embodiments of the invention it is only the colour difference [Eq. 1 and Eq. 2] rule that is used to derive the spatial interpolator equations. FIG. 14 schematically illustrates an implementation of the system shown in FIG. 13, in which a motion detection is used to select between output pixels derived by a "standard" interpolation algorithm corresponding to the arrangement of FIG. 13, and an "enhanced" interpolation algorithm making use of inter-image data. Note that the "enhanced" interpolation algorithm does not relate to the alternate-BR scanning scheme, and so is provided as technical background only.

In FIG. 14, three input frames (Frames n−1, n and n+1) are considered. Taking the frame n as the current frame, under the standard interpolation algorithm it is passed to the horizontal green interpolator 500, then to the vertical colour interpolator 510, and then to the horizontal colour interpolator 520. The output signal 560 is passed to a multiplexer arrangement comprising a first multiplier 700, a second multiplier 710 and an adder 720.

The multipliers 700, 710 receive a control signal a which is the output of a motion detector 730, indicative of inter-image motion in the input image at that pixel position. The parameter a varies between −1 and 1, having a low absolute value when inter-image motion is low, a high absolute value when inter-image motion is high, and a polarity depending on the direction (relative to the current frame) having greater inter-image motion. The derivation of this parameter will be described further below. The multiplier 700 multiplies the output signal 560 by 1−|α| (where the symbol |...| indicates absolute value) and the multiplier 710 multiplies an output signal (to be described below) of the enhanced interpolator by α, with the outputs of the two multipliers being added by the adder 720 to generate an output signal 740.

Turning now to the enhanced interpolation process, the current frame n is processed by the horizontal green interpolator 500 as described above. The previous frame n−1 and the next frame n+1 are processed by equivalent horizontal green interpolators 502, 504. In fact, depending on the design, it may be that only one horizontal green interpolator 500 is needed, with its results being stored between the processing of successive frames.

In the enhanced process, the outputs of the horizontal green interpolations are passed to enhanced vertical colour interpolators, specifically a backward enhanced vertical colour interpolator 512 and a forward enhanced vertical colour interpolator 514. These are identical in operation, apart from the fact that their inputs are different. The inputs to the backward enhanced vertical colour interpolator 512 are the outputs of the horizontal green interpolators in respect of frame n−1 and frame n. The inputs to the forward enhanced vertical colour interpolator 514 are the outputs of the horizontal green interpolators in respect of frame n and frame n+1.

The respective outputs of the backward enhanced vertical colour interpolator 512 and the forward enhanced vertical colour interpolator 514 are supplied to a multiplexer 750 which tests the polarity of the motion control signal a generated by the motion detector 730. If the polarity of the motion control signal indicates that motion is greater in a backward image direction, then the results of the backward enhanced vertical colour interpolator 512 are passed by the multiplexer 750; otherwise, or if α is zero, the results of the forward enhanced vertical colour interpolator 514 are passed by the multiplexer 750.

The output of the multiplexer 750 is passed to an enhanced horizontal colour interpolator 522, the output of which is passed to the multiplier 710 as described above.

Horizontal Green Interpolator 500 (502, 504)

This is the first stage of the demosaicing process. Horizontal estimates for the unknown green sample values that are vertically aligned with the known colour samples are calculated using a Bessel Centre Difference interpolator (though other interpolation techniques such as Sinc or linear interpolation may be used). The horizontal green interpolator is used to estimate the value of the green signal midway between the known green sample values.

Figures 15, 16, 17:
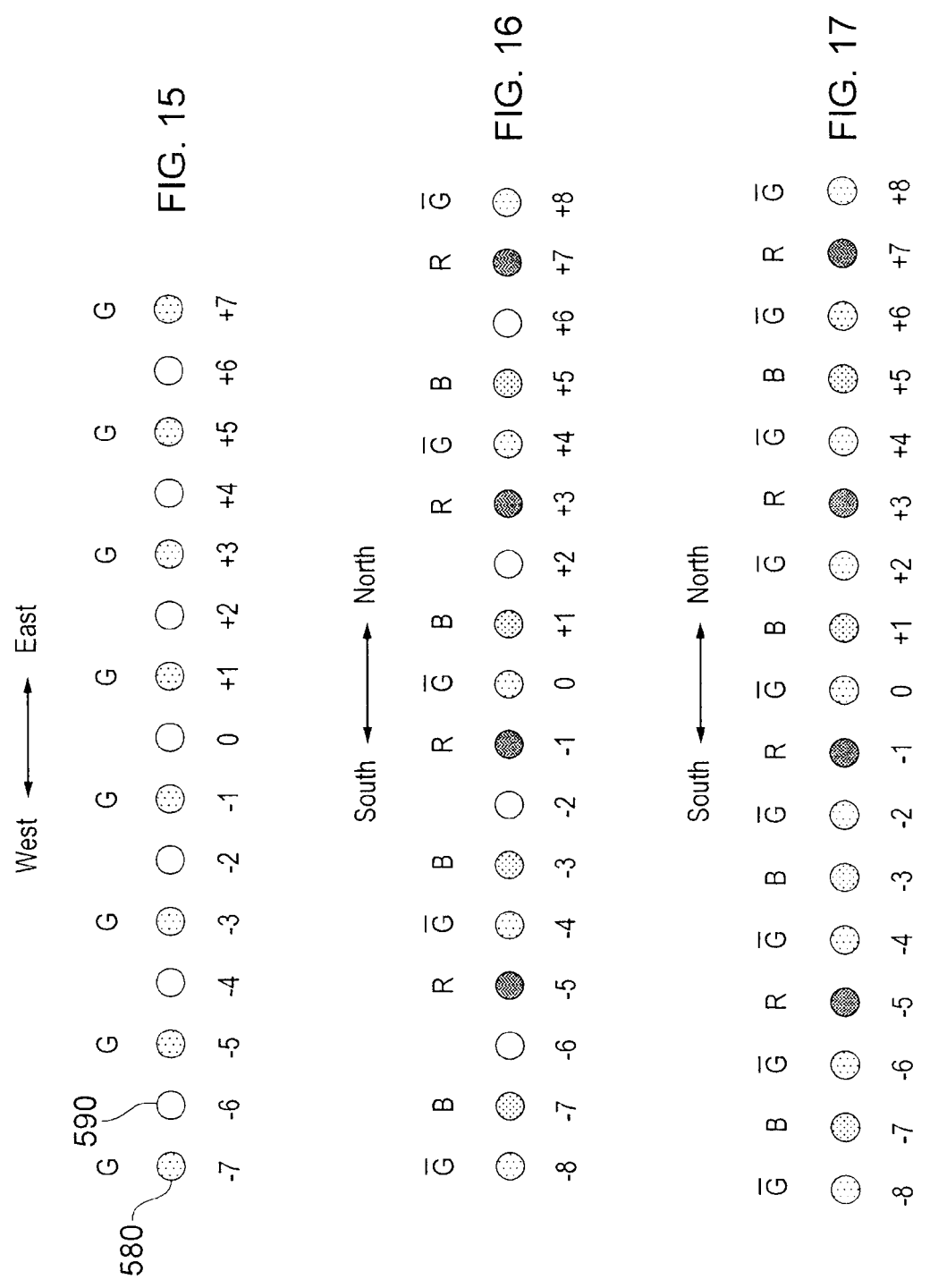

The relative spatial positions of input green (G) pixels used by this interpolator are shown schematically in FIG. 15. In this and other figures, the terms "west" and "east" refer to leftward and rightward horizontal directions within an image. The terms "south" and "north" refer to downward and upward vertical directions within an image. Shaded pixels (such as the pixel 580) indicate pixels that are used as inputs to the interpolation process under discussion. Open pixels (such as the pixel 590) are not used as inputs to the interpolation process under discussion. In FIG. 15, a centre pixel position is shown as position 0 (zero), with the relative offset to either side being numbered using integers either side of zero. The polarity of the pixel numbering is arbitrary and is just for clarity of the description.

Definitions:

G=Green Sample $\overline{G}$=Green Estimate

Note that the notation whereby a bar is drawn over a variable name is used interchangeably with the notation G' and the like.

A Bessel centre difference interpolator is used to estimate the value of the green signal at pixel position zero (shown at the centre of FIG. 14). The estimate for the unknown green signal value is calculated using the following equation.

$$\overline{G}_0 = \frac{10005}{16384}(G_{-1} + G_{+1}) - \frac{2382}{16384}(G_{-3} + G_{+3}) + \quad \text{Eq. 5}$$
$$\frac{715}{16384}(G_{-5} + G_{+5}) - \frac{170}{16384}(G_{-7} + G_{+7}) +$$
$$\frac{26}{16384}(G_{-9} + G_{+9}) - \frac{2}{16384}(G_{-11} + G_{+11})$$

Vertical Colour Interpolator 510, 512, 514

This is the second stage of the demosaicing process. The vertical colour difference interpolator is used to estimate the blue and red colour difference values at the green sample values that are calculated in the first stage.

Standard Vertical Colour Interpolator 510

This interpolator uses additional blue/red sample values from temporally adjacent frames to produce a revised estimate for the colour difference signal.

The relative spatial positions of the samples used by this interpolator are shown in FIG. 16. This interpolator can also be used when the blue and red samples are swapped by transposing all of the blue and red symbols in all of the equations.

Definitions:
G=Green Sample $\overline{G}$=Green Estimate $\overline{D}$=Colour Difference Estimate
B=Blue Sample $\overline{B}$=Blue Estimate $\overline{Db}$=Red Difference Estimate
R=Red Sample $\overline{R}$=Red Estimate $\overline{Dr}$=Blue Difference Estimate
$\alpha_B$=Blue White Balance $\alpha_R$=Red White Balance North (N) and South (S) directional estimates for the blue and red sample values are calculated using the following equations:

$$\overline{B}_S = \alpha_B\left(\frac{1}{32}B_{-7} + \frac{22}{32}B_{-3} + \frac{9}{32}B_{+1}\right) + \frac{1}{2}\overline{G}_0 - \frac{1}{2}\overline{G}_{-4} \quad \text{Eq. 6}$$

$$\overline{R}_S = \alpha_R\left(\frac{9}{32}R_{-5} + \frac{22}{32}R_{-1} + \frac{1}{32}R_{+3}\right) + \frac{1}{2}\overline{G}_0 - \frac{1}{2}\overline{G}_{-4} \quad \text{Eq. 7}$$

$$\overline{B}_N = \alpha_B\left(\frac{1}{32}B_{-3} + \frac{22}{32}B_{+1} + \frac{9}{32}B_{+5}\right) + \frac{1}{2}\overline{G}_0 - \frac{1}{2}\overline{G}_{+4} \quad \text{Eq. 8}$$

$$\overline{R}_N = \alpha_R\left(\frac{9}{32}R_{-1} + \frac{22}{32}R_{+3} + \frac{1}{32}R_{+7}\right) + \frac{1}{2}\overline{G}_0 - \frac{1}{2}\overline{G}_{+4} \quad \text{Eq. 9}$$

The South (S) estimate for the colour difference is calculated using the following equations:

$$\overline{Db}_S = \overline{B}_S - \overline{G}_0 \quad \text{Eq. 10}$$

$$\overline{Db}_S = \alpha_B\left(\frac{1}{32}B_{-7} + \frac{22}{32}B_{-3} + \frac{9}{32}B_{+1}\right) - \frac{1}{2}\overline{G}_0 - \frac{1}{2}\overline{G}_{-4} \quad \text{Eq. 11}$$

$$\overline{Dr}_S = \overline{R}_S - \overline{G}_0 \quad \text{Eq. 12}$$

$$\overline{Dr}_S = \alpha_R\left(\frac{9}{32}R_{-5} + \frac{22}{32}R_{-1} + \frac{1}{32}R_{+3}\right) - \frac{1}{2}\overline{G}_0 - \frac{1}{2}\overline{G}_{-4} \quad \text{Eq. 13}$$

The North (N) estimate for the colour difference is calculated using the following equations:

$$\overline{Db}_N = \overline{B}_N - \overline{G}_0 \quad \text{Eq. 14}$$

$$\overline{Db}_N = \alpha_B\left(\frac{1}{32}B_{-3} + \frac{22}{32}B_{+1} + \frac{9}{32}B_{+5}\right) - \frac{1}{2}\overline{G}_0 - \frac{1}{2}\overline{G}_{+4} \quad \text{Eq. 15}$$

$$\overline{Dr}_N = \overline{R}_N - \overline{G}_0 \quad \text{Eq. 16}$$

$$\overline{Dr}_N = \alpha_R\left(\frac{9}{32}R_{-1} + \frac{22}{32}R_{+3} + \frac{1}{32}R_{+7}\right) - \frac{1}{2}\overline{G}_0 - \frac{1}{2}\overline{G}_{+4} \quad \text{Eq. 17}$$

Adaptive Vertical Weighting:

$$\Delta_N = |\overline{G}_{+4} - \overline{G}_0| + \frac{1}{4}\alpha_B|B_{+1} - B_{-3}| + \quad \text{Eq. 18}$$
$$\frac{3}{4}\alpha_R|R_{+3} - R_{-1}| + \frac{3}{4}\alpha_B|B_{+5} - B_{+1}| + \frac{1}{4}\alpha_R|R_{+7} - R_{+3}|$$

$$\Delta_S = |\overline{G}_0 - \overline{G}_{-4}| + \frac{1}{4}\alpha_B|B_{-3} - B_{-7}| + \quad \text{Eq. 19}$$
$$\frac{3}{4}\alpha_R|R_{-1} - R_{-5}| + \frac{3}{4}\alpha_B|B_{+1} - B_{-3}| + \frac{1}{4}\alpha_R|R_{+3} - R_{-1}|$$

$$\Delta_V = \Delta_N + \Delta_S \quad \text{Eq. 20}$$

$$\alpha_1 = \begin{cases} \frac{1}{2} & \Delta_V = 0 \\ \frac{\Delta_N}{\Delta_V} & \Delta_V \neq 0 \end{cases}$$

Final Colour Difference Estimate:

$$\overline{Db}_0 = \overline{Db}_N - \alpha_V(\overline{Db}_N - \overline{Db}_S) \quad \text{Eq. 21}$$

$$\overline{Dr}_0 = \overline{Dr}_N - \alpha_V(\overline{Dr}_N - \overline{Dr}_S) \quad \text{Eq. 22}$$

Enhanced Vertical Colour Interpolator 512, 514

This is an alternative vertical colour difference interpolator for the enhanced demosaicing process. This interpolator uses additional green, and blue/red sample values from temporally adjacent frames to produce an revised estimate for the colour difference signal. This interpolator can be used with the alternate GBR line scan.

The relative spatial positions of the samples used by this interpolator are shown in FIG. 16. This interpolator can also be used when the blue and red samples are swapped by transposing all of the blue and red symbols in all of the equations.

Definitions:
G=Green Sample $\overline{G}$=Green Estimate $\overline{D}$=Colour Difference Estimate
B=Blue Sample $\overline{B}$=Blue Estimate $\overline{Db}$=Red Difference Estimate
R=Red Sample $\overline{R}$=Red Estimate $\overline{Dr}$=Blue Difference Estimate
$\alpha_B$=Blue White Balance $\alpha_R$=Red White Balance The North (N) and South (S) directional estimates for the blue and red sample values are calculated using the following equations:

$$\overline{B}_S = \alpha_B\left(\frac{1}{32}B_{-7} + \frac{22}{32}B_{-3} + \frac{9}{32}B_{+1}\right) + \frac{3}{4}\overline{G}_0 - \frac{1}{2}\overline{G}_{-2} - \frac{1}{4}\overline{G}_{-4} \quad \text{Eq. 23}$$

$$\overline{R}_S = \alpha_R\left(\frac{9}{32}R_{-5} + \frac{22}{32}R_{-1} + \frac{1}{32}R_{+3}\right) + \frac{3}{4}\overline{G}_0 - \frac{1}{2}\overline{G}_{-2} - \frac{1}{4}\overline{G}_{-4} \quad \text{Eq. 24}$$

$$\overline{B}_N = \alpha_B\left(\frac{1}{32}B_{-3} + \frac{22}{32}B_{+1} + \frac{9}{32}B_{+5}\right) + \frac{3}{4}\overline{G}_0 - \frac{1}{2}\overline{G}_{+2} - \frac{1}{4}\overline{G}_{+4} \quad \text{Eq. 25}$$

-continued $$\overline{R}_N = \alpha_R\left(\frac{9}{32}R_{-1} + \frac{22}{32}R_{+3} + \frac{1}{32}R_{+7}\right) + \frac{3}{4}\overline{G}_0 - \frac{1}{2}\overline{G}_{+2} - \frac{1}{4}\overline{G}_{+4} \quad \text{Eq. 26}$$

The South (S) estimate for the colour difference is calculated using the following equations:

$$\overline{Db}_S = \overline{B}_S - \overline{G}_0 \quad \text{Eq. 27}$$

$$\overline{Db}_S = \alpha_B\left(\frac{1}{32}B_{-7} + \frac{22}{32}B_{-3} + \frac{9}{32}B_{+1}\right) - \frac{1}{4}\overline{G}_0 - \frac{1}{2}\overline{G}_{-2} - \frac{1}{4}\overline{G}_{-4} \quad \text{Eq. 28}$$

$$\overline{Dr}_S = \overline{R}_S - \overline{G}_0 \quad \text{Eq. 29}$$

$$\overline{Dr}_S = \alpha_R\left(\frac{9}{32}R_{-5} + \frac{22}{32}R_{-1} + \frac{1}{32}R_{+3}\right) - \frac{1}{4}\overline{G}_0 - \frac{1}{2}\overline{G}_{-2} - \frac{1}{4}\overline{G}_{-4} \quad \text{Eq. 30}$$

The North (N) estimate for the colour difference is calculated using the following equations:

$$\overline{Db}_N = \overline{B}_N - \overline{G}_0 \quad \text{Eq. 31}$$

$$\overline{Db}_N = \alpha_B\left(\frac{1}{32}B_{-3} + \frac{22}{32}B_{+1} + \frac{9}{32}B_{+5}\right) - \frac{1}{4}\overline{G}_0 - \frac{1}{2}\overline{G}_{+2} - \frac{1}{4}\overline{G}_{+4} \quad \text{Eq. 32}$$

$$\overline{Dr}_N = \overline{R}_N - \overline{G}_0 \quad \text{Eq. 33}$$

$$\overline{Dr}_N = \alpha_R\left(\frac{9}{32}R_{-1} + \frac{22}{32}R_{+3} + \frac{1}{32}R_{+7}\right) - \frac{1}{4}\overline{G}_0 - \frac{1}{2}\overline{G}_{+2} - \frac{1}{4}\overline{G}_{+4} \quad \text{Eq. 34}$$

Adaptive Vertical Weighting:

$$\Delta_N = \frac{1}{2}|\overline{G}_{+2} - \overline{G}_0| + \frac{1}{4}\alpha_B|B_{+1} - B_{-3}| + \frac{3}{4}\alpha_R|R_{+3} - R_{-1}| + \quad \text{Eq. 35}$$
$$\frac{1}{2}|\overline{G}_{+4} - \overline{G}_{+2}| + \frac{3}{4}\alpha_B|B_{+5} - B_{+1}| + \frac{1}{4}\alpha_R|R_{+7} - R_{+3}|$$

$$\Delta_S = \frac{1}{2}|\overline{G}_{-2} - \overline{G}_{-4}| + \frac{1}{4}\alpha_B|B_{-3} - B_{-7}| + \frac{3}{4}\alpha_R|R_{-1} - R_{-5}| + \quad \text{Eq. 36}$$
$$\frac{1}{2}|\overline{G}_0 - \overline{G}_{-2}| + \frac{3}{4}\alpha_B|B_{+1} - B_{-3}| + \frac{1}{4}\alpha_R|R_{+3} - R_{-1}|$$

$$\Delta_V = \Delta_N + \Delta_S \quad \text{Eq. 37}$$

$$\alpha_V = \begin{cases} \frac{1}{2} & \Delta_V = 0 \\ \frac{\Delta_N}{\Delta_V} & \Delta_V \neq 0 \end{cases}$$

Final Colour Difference Estimate:

$$\overline{Db}_0 = \overline{Db}_N - \alpha_V(\overline{Db}_N - \overline{Db}_S) \quad \text{Eq. 38}$$

$$\overline{Dr}_0 = \overline{Dr}_N - \alpha_V(\overline{Dr}_N - \overline{Dr}_S) \quad \text{Eq. 39}$$

Horizontal Colour Interpolator 520, 522

This is the third stage of the enhanced demosaicing process. The horizontal colour interpolator uses the vertical colour difference estimates that were calculated in the second stage and the known green sample values to estimate the blue and red signal values at green pixel positions.

Standard Horizontal Colour Interpolator 520

This interpolator uses only colour difference values from the current frame to produce estimates for the blue and red signal values at green pixel positions.

The relative spatial positions of the samples used by this interpolator are shown in FIG. 18.

Definitions:
G=Green Sample $\overline{D}$=Colour Difference Estimate
$\overline{B}$=Blue Estimate $\overline{Db}$=Red Difference Estimate
$\overline{R}$=Red Estimate $\overline{Dr}$=Blue Difference Estimate
$\alpha_B$=Blue White Balance $\alpha_R$=Red White Balance A Bessel centre difference interpolator is used to estimate the value of the colour difference signal at pixel position zero. The estimates for the unknown colour difference values are calculated using the following equations.

$$\overline{Db}_0 = \frac{14297}{16384}\overline{Db}_{-1} + \frac{4766}{16384}\overline{Db}_{+3} - \frac{2043}{16384}\overline{Db}_{-5} - \frac{1459}{16384}\overline{Db}_{+7} + \quad \text{Eq. 40}$$
$$\frac{567}{16384}\overline{Db}_{-9} + \frac{464}{16384}\overline{Db}_{+11} - \frac{131}{16384}\overline{Db}_{-13} - \frac{113}{16384}\overline{Db}_{+15} +$$
$$\frac{20}{16384}\overline{Db}_{-17} + \frac{18}{16384}\overline{Db}_{+19} - \frac{1}{16384}\overline{Db}_{-21} - \frac{1}{16384}\overline{Db}_{+23}$$

$$\overline{Dr}_0 = \frac{14297}{16384}\overline{Dr}_{-1} + \frac{4766}{16384}\overline{Dr}_{+3} - \frac{2043}{16384}\overline{Dr}_{-5} - \frac{1459}{16384}\overline{Dr}_{+7} + \quad \text{Eq. 41}$$
$$\frac{567}{16384}\overline{Dr}_{-9} + \frac{464}{16384}\overline{Dr}_{+11} - \frac{131}{16384}\overline{Dr}_{-13} - \frac{113}{16384}\overline{Dr}_{+15} +$$
$$\frac{20}{16384}\overline{Dr}_{-17} + \frac{18}{16384}\overline{Dr}_{+19} - \frac{1}{16384}\overline{Dr}_{-21} - \frac{1}{16384}\overline{Dr}_{+23}$$

The final colour estimate is given by:

$$\overline{B}_0 = \frac{1}{\alpha_B}(\overline{Db}_0 + G_0) \quad \text{Eq. 42}$$

$$\overline{R}_0 = \frac{1}{\alpha_R}(\overline{Dr}_0 + G_0) \quad \text{Eq. 43}$$

Enhanced Horizontal Colour Interpolator 522

This is an alternative horizontal colour interpolator for the enhanced demosaicing process. This interpolator uses additional colour difference values from temporally adjacent frames to produce revised estimates for the blue and red signal values at green pixel positions. This interpolator can be used with both the alternate line scans.

The relative spatial positions of the samples used by this interpolator are shown in FIG. 19.

Definitions:
G=Green Sample $\overline{D}$=Colour Difference Estimate
$\overline{B}$=Blue Estimate $\overline{Db}$=Red Difference Estimate
$\overline{R}$=Red Estimate $\overline{Dr}$=Blue Difference Estimate
$\alpha_B$=Blue White Balance $\alpha_R$=Red White Balance A Bessel centre difference interpolator is used to estimate the value of the colour difference signal at pixel position zero. The estimates for the unknown colour difference values are calculated using the following equations.

$$\overline{Db}_0 = \frac{10005}{16384}(\overline{Db}_{-1} + \overline{Db}_{+1}) - \frac{2382}{16384}(\overline{Db}_{-3} + \overline{Db}_{+3}) + \quad \text{Eq. 44}$$
$$\frac{715}{16384}(\overline{Db}_{-5} + \overline{Db}_{+5}) - \frac{170}{16384}(\overline{Db}_{-7} + \overline{Db}_{+7}) +$$
$$\frac{26}{16384}(\overline{Db}_{-9} + \overline{Db}_{+9}) - \frac{2}{16384}(\overline{Db}_{-11} + \overline{Db}_{+11})$$

$$\overline{Dr}_0 = \frac{10005}{16384}(\overline{Dr}_{-1} + \overline{Dr}_{+1}) - \frac{2382}{16384}(\overline{Dr}_{-3} + \overline{Dr}_{+3}) + \quad \text{Eq. 45}$$
$$\frac{715}{16384}(\overline{Dr}_{-5} + \overline{Dr}_{+5}) - \frac{170}{16384}(\overline{Dr}_{-7} + \overline{Dr}_{+7}) +$$
$$\frac{26}{16384}(\overline{Dr}_{-9} + \overline{Dr}_{+9}) - \frac{2}{16384}(\overline{Dr}_{-11} + \overline{Dr}_{+11})$$

The final colour estimate is given by:

$$\overline{B}_0 = \frac{1}{\alpha_B}(\overline{D}b_0 + G_0) \quad \text{Eq. 46}$$

$$\overline{R}_0 = \frac{1}{\alpha_R}(\overline{D}r_0 + G_0) \quad \text{Eq. 47}$$

Motion Detector 730

Figure 20:
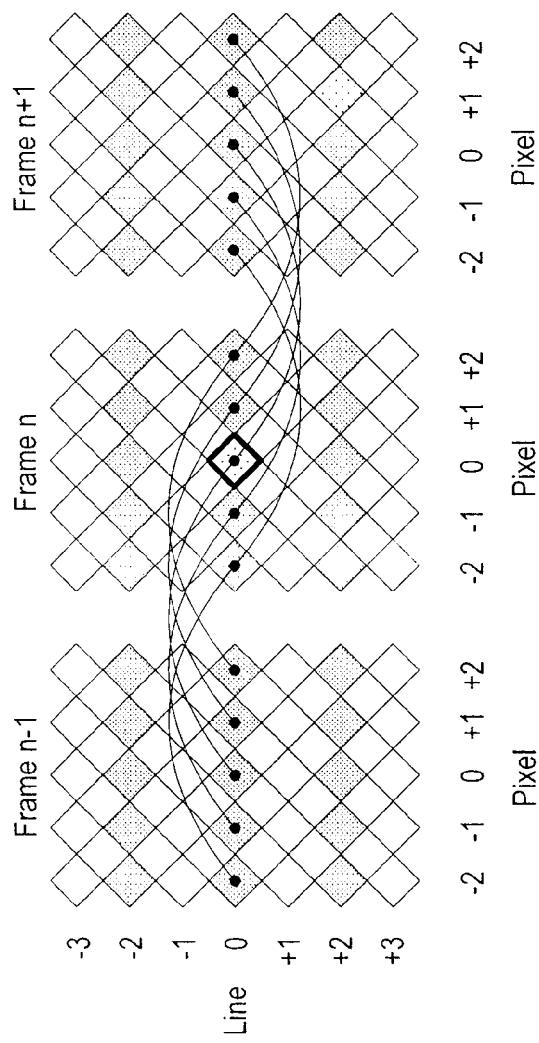
FIG. 20 schematically illustrates source pixels for a motion detection process.

FIG. 20 schematically illustrates green samples which are used to calculate the sum of absolute pixel differences (SAD) at green sample positions in all progressive scan modes. The summation takes place over an array of m×n pixels around the current pixel position.

Forward SAD Calculation:

$$SAD_{+1} = \frac{1}{m \times n} \sum_{y=0}^{m-1} \sum_{x=0}^{n-1} |G_{frame,line,pixel} - G_{frame+1,line,pixel}| \quad \text{Eq. 48}$$

Backward SAD Calculation:

$$SAD_{-1} = \frac{1}{m \times n} \sum_{y=0}^{m-1} \sum_{x=0}^{n-1} |G_{frame,line,pixel} - G_{frame-1,line,pixel}| \quad \text{Eq. 49}$$

Where:
m=3 line=2y−2
n=5 pixel=x−2
Combined SAD Calculation:

$$SAD = \begin{cases} -SAD_{-1} & SAD_{-1} < SAD_{+1} \\ +SAD_{+1} & SAD_{-1} \geq SAD_{+1} \end{cases} \quad \text{Eq. 50}$$

Figure 21:
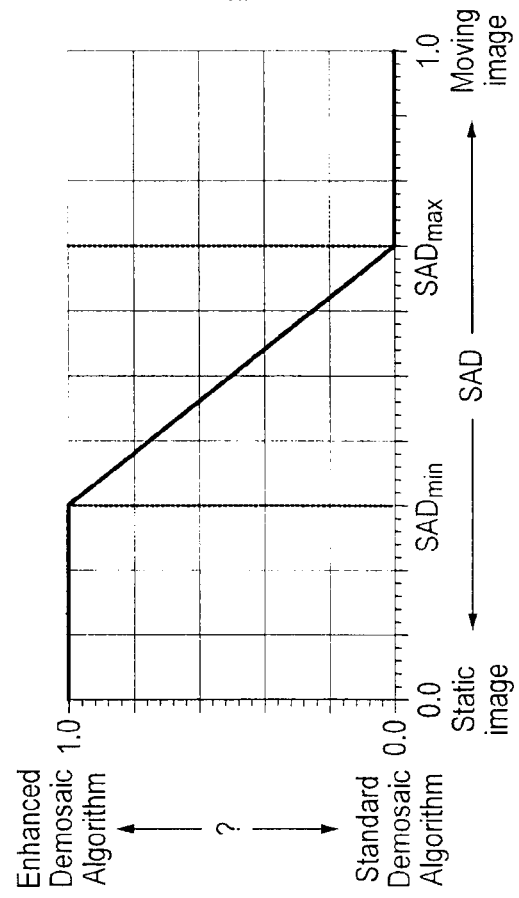
FIG. 21 schematically illustrates a motion control value.

The motion control signal ($\alpha$) is calculated from the SAD value generated by the motion detector using the following equation:

$$\alpha \begin{cases} 1 & |SAD| < SAD_{min} \\ \frac{SAD_{max} - |SAD|}{SAD_{max} - SAD_{min}} & SAD_{min} \leq |SAD| < SAD_{max} \\ 0 & |SAD| \geq SAD_{max} \end{cases} \quad \text{Eq. 51}$$

$$\alpha' \begin{cases} 1 & |SAD| < SAD_{min} \\ \frac{SAD_{max} - |SAD|}{SAD_{max} - SAD_{min}} & SAD_{min} \leq |SAD| < SAD_{max} \\ 0 & |SAD| \geq SAD_{max} \end{cases}$$

$$\alpha = \alpha' \times (SAD > 0)?1:-1 \quad \text{Eq. 52}$$

Where $SAD_{min}$ and $SAD_{max}$ are programmable constants, and the expression $\alpha=\alpha'\times(SAD>0)?1:-1$ means that the final $\alpha$ value is generated by multiplying $\alpha'$ by the sign of the SAD value. Example results of the SAD derivation are shown in FIG. 21.

As described above, at known green sample positions the motion indicator ($\alpha$) is used to blend the results of the standard demosaicing algorithm with the results of the enhanced demosaicing algorithm.

Scaling

Figure 22:
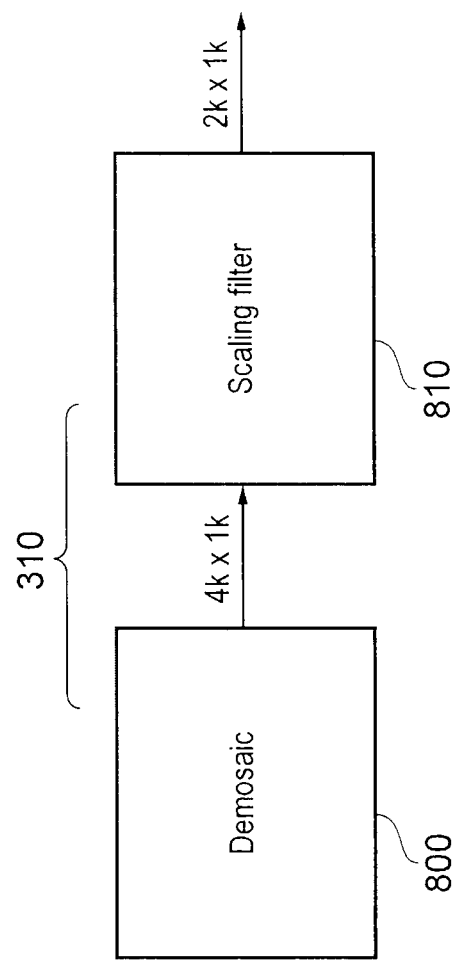
FIG. 22 schematically illustrates a demosaic and down converter unit.

FIG. 22 schematically illustrates the demosaic and down converter unit 310, which is formed of a demosaic processor 800 (as described above) and a scaling filter 810. The demosaic processor 800 generates a 4k×1k image, and the scaling filter 810 converts this to a 2k×1k image.

The 4096×1080 image from the demosaic process is scaled by the scaling filter 810 to the following output formats simultaneously:
2048×1080
1920×1012

The 2048×1080 requires a 2→1 scaling horizontally and no scaling vertically, while the 1920×1012 scaling requires a 32→15 scaling horizontally and a 16→15 scaling vertically. The aspect ratio (H:V) is maintained for both output formats at 256:135.

The output image (4096×1080) is generated by scaling horizontally and vertically using one of the following methods, to the correct output dimensions.
Sinc Scaling Filter
Linear Scaling Filter
Gaussian Scaling Filter The number of taps used for each type of scaling filter are listed below:

| Scaling Filter | Horizontal Taps | Vertical Taps |
| --- | --- | --- |
| Sinc Function | 7 | 7 |
| Gaussian Function | 7 | 5 |
| Linear Function | 5 | 3 |

The Sinc scaling filter taps are generated using the Sinc scaling function:

$$y = \frac{\sin(\pi x)}{\pi x} \quad \text{Eq. 53}$$

The horizontal and vertical Sinc scaling filters produce the sharpest output image. The frequency response is not circular and some ringing is noticeable even with ringing reduction enabled.

The filter taps are generated using known techniques. The linear scaling filter taps are generated using the linear scaling function:

$$y = \begin{cases} 1 - |x| & \text{where } |x| < 1 \\ 0 & \text{elsewhere} \end{cases} \quad \text{Eq. 54}$$

The horizontal and vertical linear scaling filters use the smallest number of filter taps.

The Gaussian scaling filter taps are generated using the Gaussian scaling function:

$$y \rightarrow e^{-\pi x^2} \quad \text{Eq. 55}$$

The horizontal and vertical Gaussian scaling filters produce a smooth output image with a circular frequency response.

Frame Stores

Figure 23:
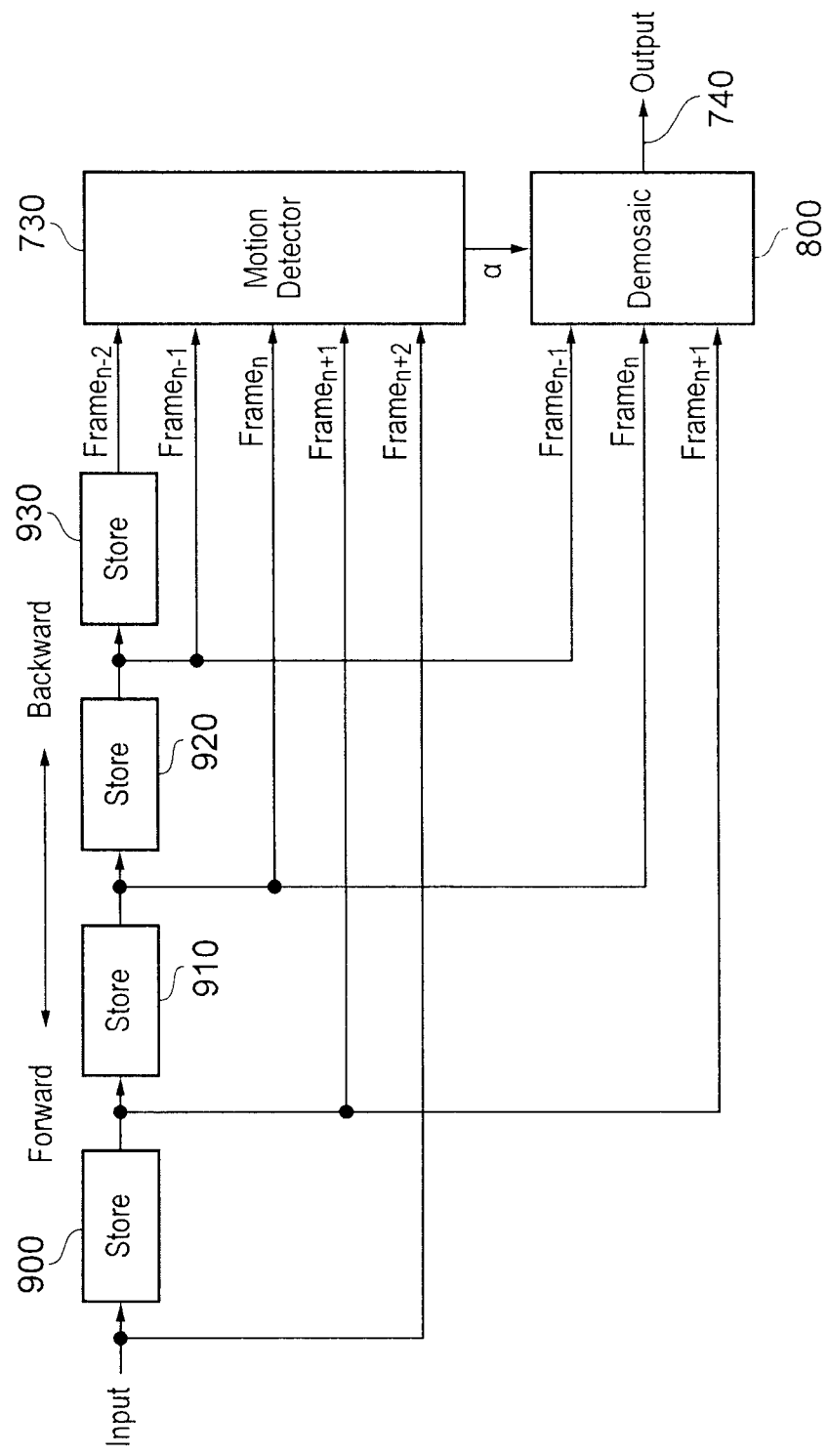
FIG. 23 schematically illustrates the use of frame stores.

FIG. 23 schematically illustrates an arrangement of frame stores suitable for providing the past and future frames (relative to a currently processed frame n) to the demosaic processor 800 and to the motion detector 730. Frame stores 900, 910, 920 and 930 are provided, with data being passed from one frame store to the next (in the sequence from left to right as drawn) after a respective one frame delay.

Software Implementation

The techniques described above can of course be implemented by computer software running on a general purpose data processing apparatus, by hardware, by programmable hardware such as an application specific integrated circuit or a field programmable gate array, or by combinations of these. Where an implementation involves computer software, it will be appreciated that such software, and a non-transitory machine-readable medium carrying such software, such as an optical disc, a magnetic disk, semiconductor memory or the like, represent embodiments of the invention.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings hearing, define, in part, the scope of the foregoing claim terminology such that no inventive subject matter is dedicated to the public.

The invention claimed is:

1. An image sensor comprising:
   an array of photosensors each having a respective colour filter so as to restrict the sensitivity of that photosensor to a primary colour range selected from a set of three or more primary colour ranges, the array being such that the photosensors in alternate rows are sensitive to a first primary colour range, and photosensors in intervening rows are sensitive to the other primary colour ranges; and
   a pixel data reader configured to output, in respect of each successive image of a video signal, pixel data from a first subset of the rows sensitive to the first primary colour range, the first subset being the same from image to image of the video signal;
   the pixel data reader being configured to output pixel data from a second subset of the rows of photosensors sensitive to the other primary colour ranges, the second subset changing from image to image of the video signal.

2. The sensor according to claim 1, in which the first primary colour range is a green range, and the other primary colour ranges are blue and red ranges.

3. The sensor according to claim 1, in which the first subset comprises alternate ones of those rows sensitive to the first primary colour range.

4. The sensor according to claim 1, in which the second subset alternates, from image to image of the video signal, between two possible second subsets of rows.

5. The sensor according to claim 4, in which the two possible second subsets comprise:
   a second subset comprising those rows immediately beneath respective rows in the first subset; and
   a second subset comprising those rows immediately above respective rows in the first subset.

6. The sensor according to claim 1, in which pixel positions in the rows in the second subset are horizontally offset with respect to pixel positions in the rows of the first subset.

7. An image processing apparatus comprising:
   a demosaic processor configured to receive a video signal comprising pixel data from an array of photosensors each having a respective colour filter so as to restrict the sensitivity of that photosensor to a primary colour range selected from a set of three or more primary colour ranges, the array being such that the photosensors in alternate rows are sensitive to a first primary colour range, and photosensors in intervening rows are sensitive to the other primary colour ranges;
   the pixel data comprising:
     pixel data from a first subset of the rows sensitive to the first primary colour range, the first subset being the same from image to image of the video signal; and
     pixel data from a second subset of the rows of photosensors sensitive to the other primary colour ranges, the second subset changing from image to image of the video signal;
   the demosaic processor comprising a vertical interpolator for vertically shifting pixel data of the second subset so as to be vertically aligned with pixel data of the first subset.

8. The apparatus according to claim 7, in which pixel positions in the rows in the second subset are horizontally offset with respect to pixel positions in the rows of the first subset, further comprising:
   a first horizontal interpolator for horizontally shifting the pixel positions of pixel data of rows of the first subset so as to provide intermediate pixel data which is vertically aligned with pixel data of rows of the second subset, the intermediate pixel data being supplied as an input to the vertical interpolator; and
   a second horizontal interpolator for horizontally shifting pixel data output by the vertical interpolator so as to be horizontally aligned with pixel data of rows of the first subset.

9. A video camera apparatus comprising:
   an image sensor; and
   the image processing apparatus according to claim 7 configured to process images captured by the image sensor, the image sensor including:
     an array of photosensors each having a respective colour filter so as to restrict the sensitivity of that photosensor to a primary colour range selected from a set of three or more primary colour ranges, the array being such that the photosensors in alternate rows are sensitive to a first primary colour range, and photosensors in intervening rows are sensitive to the other primary colour ranges; and
     a pixel data reader configured to output, in respect of each successive image of a video signal, pixel data from a first subset of the rows sensitive to the first primary colour range, the first subset being the same from image to image of the video signal;
     the pixel data reader being configured to output pixel data from a second subset of the rows of photosensors sensitive to the other primary colour ranges, the second subset changing from image to image of the video signal.

10. An image processing method comprising:
    receiving a video signal comprising pixel data from an array of photosensors each having a respective colour filter so as to restrict the sensitivity of that photosensor to a primary colour range selected from a set of three or more primary colour ranges, the array being such that the photosensors in alternate rows are sensitive to a first primary colour range, and photosensors in intervening rows are sensitive to the other primary colour ranges;
    the pixel data comprising:
      pixel data from a first subset of the rows sensitive to the first primary colour range, the first subset being the same from image to image of the video signal; and pixel data from a second subset of the rows of photosensors sensitive to the other primary colour ranges, the second subset changing from image to image of the video signal;

the method comprising vertically shifting pixel data of the second subset so as to be vertically aligned with pixel data of the first subset.

11. A non-transitory machine-readable storage medium on which is stored computer software for carrying out the method of claim 10.

* * * * *